United States Patent Office 3,120,137
Patented Feb. 4, 1964

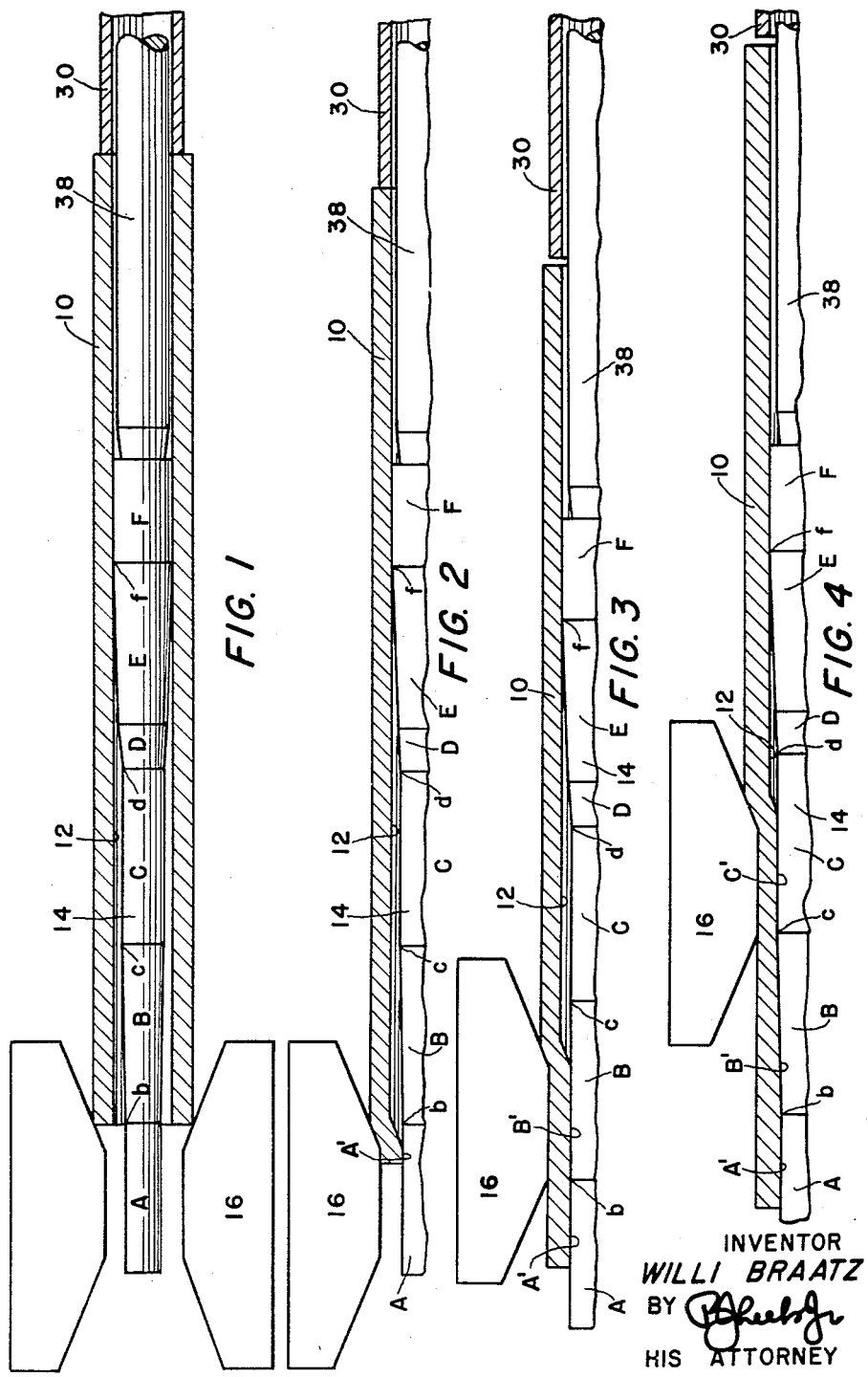

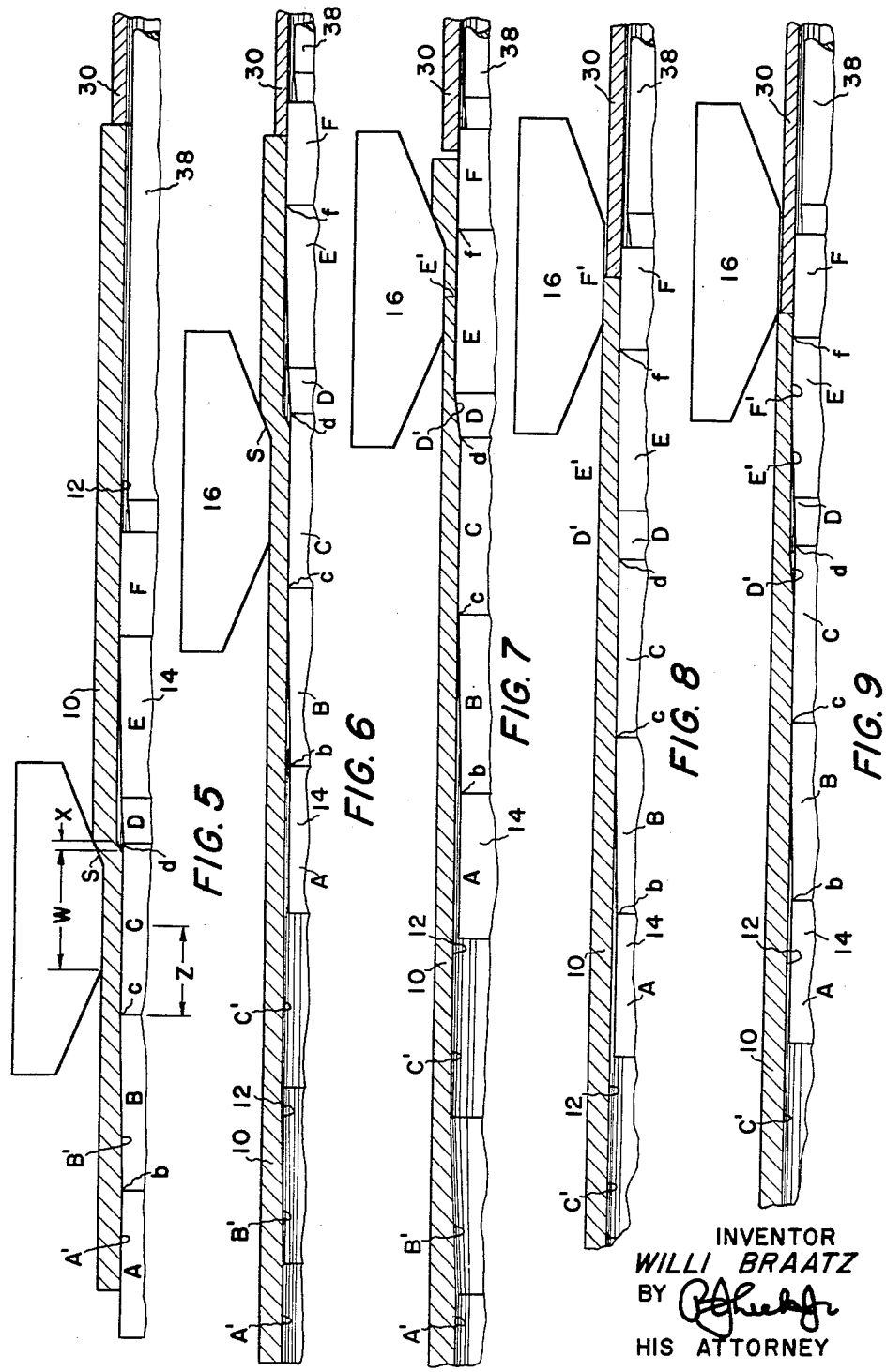

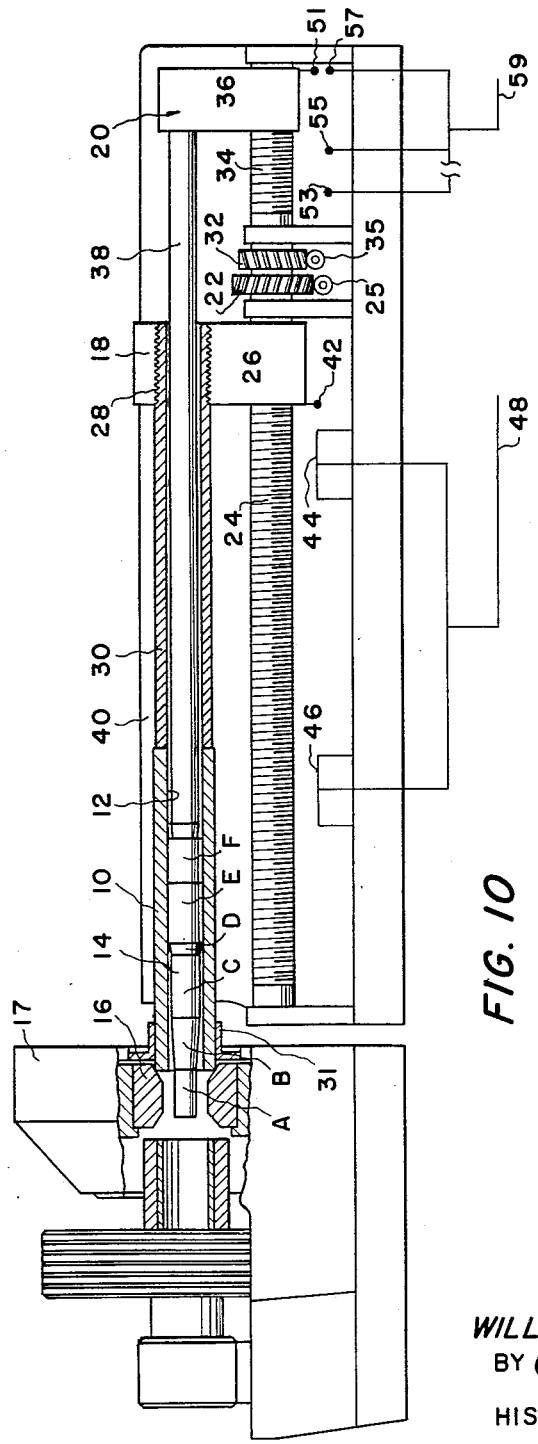

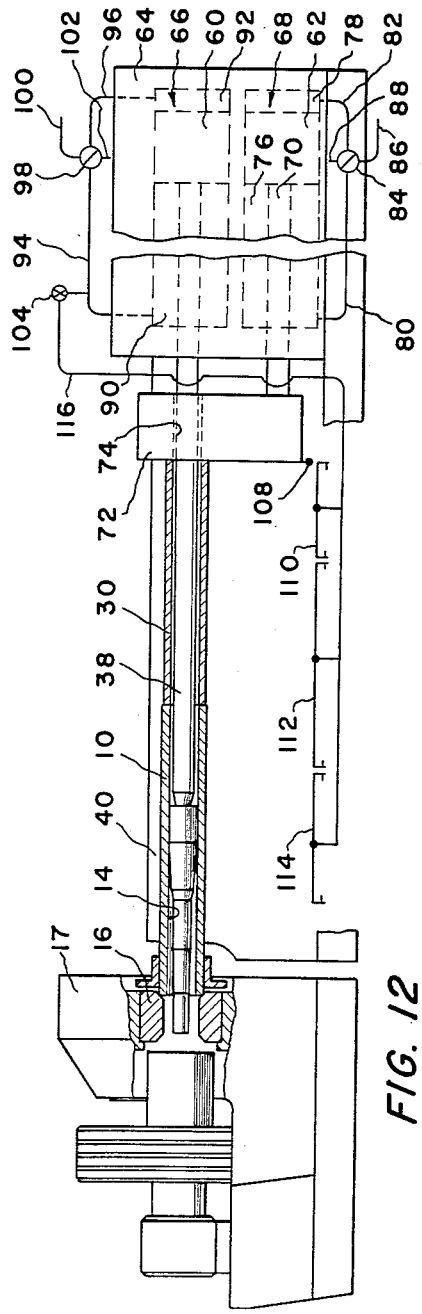
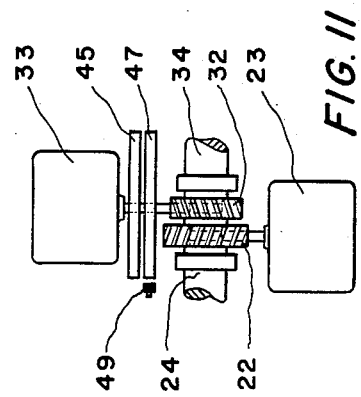

3,120,137
APPARATUS FOR FORMING VARYING SHAPED
BORES IN HOLLOW MEMBERS
Willi Braatz, Cincinnati, Ohio, assignor to Canadian
Ingersoll-Rand Company Limited, Montreal, Quebec,
Canada, a corporation of Canada
Original application Jan. 3, 1961, Ser. No. 80,151. Divided and this application Dec. 21, 1961, Ser. No. 168,863
3 Claims. (Cl. 78—14)

This invention relates to apparatus for forming internal shapes and particularly within cylindrical members. This application is a divisional application of U.S. patent application, Serial No. 80,151, filed January 3, 1961, by W. Braatz, and entitled "Method of Forming Varying Shaped Bores in Hollow Members."

One object of this invention is to ensure that the length of the formed shape is accurate.

Another object of this invention is to ensure forming a tapered shoulder of accurate length in the surface of a bore defined by the member.

Another object of this invention is to ensure accurate distance between a pair of such shoulders joined by a bore section of uniform diameter.

Further objects will become obvious from the following specification in which:

FIGURES 1 through 9 are longitudinal elevations, partly in section, showing the preferred application of the process in various stages, FIG. 10 is a longitudinal elevation, partly in section, showing a swaging machine and a feed mechanism for the member and a mandrel, FIG. 11 is a plan view showing an electrical device for driving the feed mechanism shown in FIG. 10 and showing how such device is connected thereto, and FIG. 12 is a longitudinal elevation, partly in section, showing the swaging machine in FIG. 10 with a hydraulic feed mechanism for the member and the mandrel.

The process for forming the bore of a cylindrical member 10 comprises, in general, the steps of first forming a bore 12 greater than the desired bore size through the cylindrical member 10. Then a mandrel 14 designed to be unaffected by pressure applied thereto and having at least one cylindrical forming portion and a shoulder forming portion is inserted in the bore 12. Following this step pressure is rapidly and repeatedly applied on and around a relatively short section of the exterior of the member 10 of sufficient magnitude to compress and cold form the material of the member 10 to the shape of the mandrel 14. The pressure used to deform the member 10 is applied by suitable means, such as longitudinal stationary dies 16 rotated and driven radially in and out by a machine 17. Preferably the dies have a constant radial stroke, but the radial positions of the dies are variable.

The mandrel length is less than the bore length but greater than the length of the member portions subjected to pressure. Accordingly, as pressure is applied progressively along the member 10, the appropriate section of the mandrel 14 is maintained within the area of applied pressure which is the sphere of influence of the dies 16.

A known method for forming a member having a bore with one portion of uniform cross section and another portion of varying cross section is to feed both the member 10 and the mandrel 14 simultaneously through the dies until the entire member 10 is formed.

However it is noted that the dies 16 in deforming the member 10 produce an elongation or material flow of the member 10. That is, the speed or feed out rate of the member 10 leaving the sphere of influence of the dies 16 is greater than the speed or feed in rate of the member 10 entering the sphere of influence of the dies 16 by the amount of material flow. Hence, with the known method described, the length of formed member is greater than the desired length by the amount of material flow or elongation. Therefore, if the varying cross section portion to be formed is in the form of a tapered shoulder, the elongation of the member 10 as the shoulder is being formed would be towards the feed-in side of the die. However, in this known method, a push rod or other device is used to feed the member into the die from the feed-in side of the die and therefore the push rod prevents elongation at the feed-in side of the die resulting in a series of minute steps being formed in the bore surface of the shoulder. In forming precision instruments, such as a gun barrel, these detrimental features result in a poor product which may have to be discarded.

The present invention ensures elongation does not result in these detrimental features and in particular in inaccuracies in a bore portion of varying cross section and more particularly in a bore portion defining a tapered shoulder. This is accomplished by retarding the rate of feed of the push rod to permit elongation of the member 10 at the feed-in side of the die while the mandrel carries or feeds the member past the dies. In other words, while the mandrel 14 feeds the member 10 into the dies, the push rod travels at a slower rate of feed than the mandrel whereby the slower moving push rod cannot interfere with the elongation of the member 10 at the feed-in side of the die as it is being fed into the dies by the mandrel 14.

In the process of forming a gun barrel as hereinafter described two methods are employed for maintaining the proper relative position between the mandrel and bore shoulders.

When using the hydraulic feed device in forming the gun barrel, a mandrel shoulder is moved into the dies 16 in the direction of the feed of the member 10 at the feed out rate thereof. When using the electrical feed device in forming the gun barrel, a mandrel shoulder is moved into the dies 16 at a rate greater than the feed out rate of the member 10 until an abutment is formed on the gun barrel against which the mandrel shoulder can bear. At such time not only is the mandrel shoulder stationary relative to the formed portion of the bore shoulder, but the mandrel 14 carries the member 10 through the dies 16.

When forming bore portions of constant cross section elongation can usually be compensated for by mathematically determining the amount of elongation for a given length of member 10 subjected to the dies 16 and adjusting for the same. For example, if for every 9.95 inches of the member 10 subjected to the dies 16 the member elongated .05 inch and it was desired to form a member section of 10 inches, then only 9.95 inches of the member 10 should be subjected to the influence of the dies 16.

As a practical matter when forming bore portions of constant cross section the end of the mandrel and the end of the blank are fairly close together but not usually in alignment and measuring is started when the mandrel becomes stationary subtracting the distance the dies have already traveled over the beginning portion of the blank that is to be of constant cross section.

However, under some circumstances, when forming bore portions of constant cross section it may be impossible or less desirable to adjust for elongation by subjecting a member length equal to the desired length less the amount of elongation for that member length to the dies 16. For example, it is impossible to compensate for such elongation when forming a bore portion that is to have a segment of uniform diameter with a length less than the sphere of influence of the dies 16 and tapered shoulders at opposite ends of the segment. The present invention eliminates inaccuracies in such instances by maintaining the mandrel segment stationary relative to the bore segment formed thereon.

The remaining portion of this specification discloses the preferred application of the present invention in that it discloses an accurate method for forming a gun barrel. In the process both the relative feed method and the compensating feed method are used to their respective advantages.

The structure used to perform this process can be of any suitable type as long as the mandrel feed may be moved at different rates of feed than the member feed. By way of illustration an electrical feed mechanism is shown in FIGS. 10 and 11 and a hydraulic feed mechanism is shown in FIG. 12.

Referring first to FIGS. 10 and 11 the electrical feed mechanism comprises independently operated feeding means 18 and 20 for the member 10 and mandrel 14, respectively.

The feed 18 includes a gear 22 secured to one end of a feed screw 24. The feed screw 24 is rotatably mounted at both ends to a frame 40 and the gear 22 is driven by a reversible electrical motor 23 located adjacent the gear 22 through a worm gear 25 (as shown in FIG. 11). As the gear 22 is driven it imparts rotary motion to the feed screw 24. A slide 26 has a threaded bore therethrough (not shown) which encircles and meshes with the screw threads so that the rotatable screw 24 imparts longitudinal movement to the slide 26. The slide 26 also includes a bore 28 therethrough threaded to receive a complementary threaded hollow push rod 30 which abuts against the rearward end of the member 10. Therefore, as the slide 26 is moved toward the dies 16, the push rod 30 moves the member into the dies 16. The member 10 is held in a position to be properly fed into the dies 16 by the push rod 30 abutting thereagainst.

In a manner similar to the member feed 18, the independent mandrel feed 20 includes a gear 32 secured at one end of a feed screw 34 supported by the frame 40. A reversible motor 33 drives the screw 34 through a worm gear 35 and the gear 32. A slide 36 is threaded on the screw 34 and carries a rod 38 so that rotation of the screw 34 imparts longitudinal movement to both the slide 36 and rod 38.

The screw 34 is located rearwardly of the screw 24 with the gear 32 adjacent the gear 22. In addition, the screw 34 and the rod 38 are in axial alignment with the screw 24 and push rod 30, respectively. The mandrel rod 38 as desired can be rotatably mounted or fixed at one end to the slide 36 with the opposite end extending through the bore 28 and the hollow push rod 30 and suitably connected to the mandrel 14.

The motors 23 and 33 are located on opposite sides of the frame 40 and are designed to rotate at equal speeds throughout the process. To allow the mandrel 14 to carry the member 10 through the dies 16 while the push rod 30 lags the member 10, as hereinafter described, the gear 32 is of a smaller size than the corresponding gear 22 so that the screw 34 rotates faster than the screw 24. Accordingly, the mandrel slide 36 is capable of moving the rod 38 and mandrel 14 faster than the rod 30.

However, as hereinafter described, it is often desired to hold the mandrel 14 within the dies 16 while permitting the push rod 30 to drive the member 10 through the dies 16. To this end an electrically operated clutch of any known type, here denoted by 45, engages and disengages the motor 33 to the worm gear 35. In this manner, the mandrel 14 is alternately held within or moved through the dies 16.

To properly determine the movement of the mandrel 14, by way of illustration only, an electrical contact system is provided which will cause the clutch 45, when current is supplied thereto, to engage the motor 33 to the gear 35. Conversely when current is not supplied to the clutch 45 it will disengage the motor 33 from the gear 35.

The contact system comprises an input contact in the form of a button 42 located on the underside of the member slide 26 adapted to supply electric current from a suitable source (not shown) to electrical strips 44 and 46 located on the frame 40 whenever in contact therewith. The strips 44 and 46 correspond to the number of times the mandrel 14 is to carry the member 10 through the dies 16 and are of such lengths to correspond to the duration of time the motor 33 is to drive the mandrel 14. A wire 48 common to both strips 44 and 46 is connected to the clutch 45 and the current conveyed thereto by the wire 48 is adapted to actuate the same.

When changing over from the mandrel 14 to the push rod 30 driving the member 10 through dies 16 it is desirable to have a smooth interchanging of feeds. In essence what is done is to gradually decrease the speed of the faster moving mandrel 14 so that lagging push rod 30 may catch up to the member 10 and take over the feed of the member 10 smoothly. Accordingly, when the clutch disengages the motor 33 from the gear 35, the inertia of a flywheel 47 secured to the gear 35 drives the mandrel 14 through the dies 16 at a gradually decreasing speed. And the constant speed push rod 30 catches up to the member 10 and takes over the feeding of the member 10.

In addition to causing a smooth changeover of feeds, the flywheel 47 aids in moving the appropriate mandrel section within the dies 16. At the time such section is centered within the dies 16 an electrically actuated brake 49 stops the wheel 47, thereby stopping the forward progress of the mandrel 14. It is noted the mandrel 14 is not halted until the feeds have been smoothly changed.

An electrical contact system shown by way of illustration is adapted to actuate the brake 49 and includes an input contact in the form of a button 51 located on the underside of the mandrel slide 36 adapted to supply current from a suitable source (not shown) to the buttons 53, 55 and 57 located on the frame 40 whenever in contact therewith. The number of frame buttons correspond to the number of times the mandrel 14 is to be held within the dies 16 and are spaced apart to correspond to the distances between centers of mandrel sections of uniform diameter. A wire 59 common to the frame buttons 53, 55 and 57 is connected to the brake 49 and current supplied to the wire 59 is supplied thereby to the brake to actuate the same.

When the process is completed and it is desired to return the push rod 30 and mandrel 14 to starting position, the clutch 45 is manually thrown into engaging position and the directions of rotation of the motors 23 and 33 are reversed. The buttons 42 and 51 likewise may be manually moved out of position to prevent contact with the frame strips and buttons, respectively.

In FIGS. 1 through 9 the steps in forming a gun barrel are shown. For convenience the dies 16 are shown in their innermost working position and in each of the FIGS. 2–9 only one of the dies 16 is shown. Further, for simplicity the die 16 is moved from left to right. Actually, the die 16 remains stationary in the longitudinal direction while the member 10 and mandrel 14 are moved. In addition, the mandrel sections are lettered from A to F and the corresponding bore portions are lettered from A' to F'.

In FIG. 1 the relation between the mandrel 14 and the member 10 is shown just prior to the entrance of said member 10 into the sphere of influence of the dies 16.

In FIG. 2 the process is beginning its first stage. The bore portion A' to be deformed to the mandrel section A is of uniform diameter. Accordingly, neither the mandrel motor 33 nor the flywheel 47 are driving the mandrel 14 so that the mandrel section A maintains its centered position within the sphere of influence of the dies 16. At the same time, the member 10 is fed by the push rod 30 through the dies 16 which deforms the bore portion A' to the mandrel section A. The length of the member 10 fed into the die 16 is the desired length less the calculated amount of elongation. In this manner the bore portion A' is of accurate length. However, since this is a terminal portion of the bore, if desired, an excess length may be formed and then cut to accurate length. In FIGURES 1 and 2 the elongation of the member 10 is to the left, because the force of the push rod 30 pushing the member 10 into the dies will not allow the member 10 to elongate to the right.

The next portion B' to be formed is a tapered shoulder. At the commencement of forming the shoulder B' the leading edge b of the mandrel shoulder B should be directly underneath the foremost point S of the effective area of the die 16 in order to form a shoulder of accurate length. By effective die area it is meant that length of die 16 which is capable of deforming the member 10 into contact with the mandrel 14 and is indicated by the distance W in FIG. 5.

To bring the leading edge b of the mandrel portion B directly underneath the point S, the mandrel 14 must be moved forwardly into the dies 16 a distance which is indicated as X and which is equal to the distance between the point S and the leading edge of the shoulder about to be formed. Accordingly just prior to the completion of bore portion A' the button 42 makes contact with the strip 44, thereby engaging the worm gear 35 to the motor 33. As a result the motor 33 begins driving the mandrel 14. However until the mandrel 14 is moved the distance X bore portion A' is still being formed. In order to commence the advancement of the mandrel at the proper time, the distance that contact 42 travels from its initial starting position until it contacts the strip 44 is essentially equal to the desired length of bore portion A, less the calculated amount of elongation, less the distance X.

When the point b of the shoulder B' is directly under the point S the formation of the bore portion A' is completed and the formation of the tapered shoulder B' commences. As soon as the initial portion of the shoulder B' is formed and against which the mandrel section B can bear the faster moving mandrel 14 carries the member 10 through the die 16. In the present process the mandrel section B is driven through the die 16 at a faster rate than the push rod 30 by an amount greater than the rate of longitudinal material flow of said member 10. As a result the feeding of the member 10 becomes independent of the push rod 30 which lags the member 10, as shown in FIG. 3. In FIGURE 3 the member 10 elongates to the right since the push rod 30 no longer abuts the member 10.

However, note the mandrel rod 38 can move at a speed relative to the push rod 30 by as little as the speed of the longitudinal component of material flow and the mandrel shoulder will still be held against the shoulder of the bore portion B' and carry the member 10 through the die 16.

In FIG. 3 point b has been brought within the effective length W of the die 16 and the formation of the shoulder B' is well under way. As the next bore portion C' is of uniform diameter, the motor 33 will continue to drive the mandrel 14 through the die 16 until the terminal end of the section B, as indicated by c, is brought within the effective length W of the die 16. As soon as the point c is directly underneath point S, in the described process, contact between the button 42 and the strip 44 terminates so that the clutch 45 disengages the gear 35 from the motor 33. It is to be noted from the foregoing that the length of the strip 44 corresponds to the length X plus the longitudinal length of the shoulder B.

It is also to be noted as a practical matter a smooth changeover can be accomplished by having the motor 33 drive the mandrel point c past point S. However the motor 33 must be disconnected from the mandrel 14 sufficiently before the mandrel section C is centered within the die 16 to allow the speed of the mandrel 14 to be gradually decreased as the push rod 30 once again takes over the member feed.

In FIG. 4 the motor 33 is no longer driving the mandrel 14, however, the inertia of the flywheel 47 drives the mandrel 14 which in turn drives the member 10 into the die 16 because of the already formed shoulder portion against which mandrel 14 bears. Therefore, as the push rod 30 is catching up to the member 10 the formation of the bore portion C' begins without interruption.

In FIG. 5 the push rod 30 once again abuts member 10 and the now slower moving mandrel 14 discontinues feeding the member 10 through the die 16 as the rod 30 once again assumes feeding of the member 10. The mandrel section C, as shown in FIG. 5, is centered within effective area of the die 16 and at such time mandrel button 51 comes into contact with the frame button 53 in order that brake 49 may be applied to the wheel 47 to halt the mandrel 14.

It is to be noted from the foregoing with this method the changing of feeds is done smoothly and the appropriate mandrel section C is centered within the effective area of the die 16 while the formation of the bore continues without interruption.

In FIG. 6 the forming of the bore portion C' of constant cross section is almost completed. The length of member 10 fed into the die 16 is the desired length less the calculated amount of elongation. In this manner the bore portion C' is of accurate length.

The distance between the strips 44 and 46 is the desired length of the uniform portion C less the distance X, which in this case is the distance between point S and the leading edge D with allowance being made for the elongation of bore portion C. It is to be noted that since the member 10 elongated to the right while tapered bore portion B was being formed the position of the button 42 was effected by such elongation since it can be assumed that the button 42 is fixed in relationship to the end of the member 10. Thus the longitudinal elongation of tapered bore portion B would have to be taken into consideration when determining the distance between contacts 44 and 46.

Although in the above description, the button 42 is fixed with relationship one end of the member 10 (the right hand end as viewed in FIGURE 10) a button (not shown) may also be fixed to the other end to accomplish the same results. This second button may be used alone or in conjunction with button 42 with each button performing all or part of the necessary control functions depending on the requirements as determined by the properties of the metal of which the member 10 is made and the shape and form of the bore sections to be formed.

The next adjoining bore portions D' and E' are to be tapered shoulders and the leading edge d of D' is rearwardly of the die point S. As before pointed out in forming the shoulder B' upon completion of the bore portion of uniform diameter of desired length, the foremost point of the shoulder, here d is to be directly under the point S. Accordingly, the button 42 makes contact with the strip 46 a distance X (as shown in FIG. 5) before the completion of the bore portion C'. Here again, as in forming bore portion B', the mandrel 14 moves at a rate relative to the member 10 greater than the longitudinal component of material flow. And mandrel sections D and E carry the member 10 through the die 16 as soon as the initial portion of shoulder D' is formed and against which the mandrel section D can bear.

In FIG. 7 the formation of shoulders D' and E' is well under way with the mandrel 14 carrying the member 10 through the die 16 by bearing against the already formed portions of shoulders D' and E' while the push rod 30 lags the member 10.

In FIG. 8 the bore portion F' is of uniform diameter. Here again, as in forming bore portions A' and C' of uniform diameter, the mandrel section of uniform diameter, F, is held within the sphere of influence of the die 16 while the member 10 is fed therethrough by the push rod 30.

Accordingly, in a manner similar to that described in going from forming the tapered shoulder B' to forming the bore portion C' of uniform diameter, contact between the frame contact 46 and the slide contact 42 is discontinued upon completion of forming shoulder E', that is when point f on the mandrel 14 is directly underneath point S on the die 16. As a result the mandrel speed is gradually decreased by the flywheel 47 while the push rod 30 once again takes over the feeding of the member into the die 16. And as before the mandrel button 51 comes into contact with frame button 57 after the smooth interchange of feeds, to cause the brake 49 to be applied to the wheel 47 to halt the mandrel section F within the effective area of the die 16.

It is to be noted that the length of the strip 46 is equal to the distance X plus the longitudinal lengths of the mandrel shoulders D and E. Also the distance between buttons 55 and 57 is equal to the distance from the center of mandrel section C to the center of the mandrel section F.

In FIG. 9 the forming of the internal shape of the member 10 is completed and said member 10 is out of the sphere of action of the die 16. Having pushed the member 10 out of the sphere of action, the push rod 30 and the mandrel 14 are returned to their starting position by reversing the direction of rotation of the motors 23 and 33 ready to repeat the described process.

As an alternate to feeding the member 10 and the mandrel 14 into the dies 16 with the push rod 30 and rod 38, respectively, by the electrical feed mechanism, a hydraulic feed mechanism may be used. By way of illustration, such an alternate mechanism is shown in FIG. 12.

The structure comprising this feed mechanism includes a pair of fluid actuated pistons 60 and 62 housed in a casing 64 mounted on the frame 40 which defines a pair of chambers 66 and 68 having parallel axes and in which the pistons 60 and 62, respectively, are slidably mounted.

The upper chamber 66 is in axial alignment with the member 10 and the piston 60 therein has the rod 38 extending therefrom with the mandrel 14 suitably connected to said rod 38. The chamber 68 for the piston 62 is below the member 10. A stem 70 extends from the piston 62 and is secured to an upstanding slide 72 to which the rod 30 is secured at the upper end thereof so that the rod 30 abuts the member 10. Accordingly, the slide 72 has a threaded bore 74 therethrough in axial alignment with the axis of the member 10 for securing the complementary threaded push rod 30 to the slide 72 and for permitting the rod 38 to extend therethrough.

The member piston 62 is actuated by alternately supplying and exhausting pressure fluid to and from the forward and rearward chamber portions 76 and 78, respectively, of the chamber 68 through pipes 80 and 82, connected to the chamber portions 76 and 78, respectively, and to a four-way valve 84 having an inlet 86 and an exhaust 88. The pressure fluid is conveyed to the inlet 86 from a suitable source (not shown) and is of sufficient pressure to move the piston 62 in a desired manner.

The piston 60 is actuated in an identical manner and has counterparts; forward and rearward chamber portions 90 and 92, respectively, of the chamber 66, pipes 94 and 96 connected to the chamber portions 90 and 92, respectively, and a four-way valve 98 having an inlet 100 and an exhaust 102.

The hydraulic feed mechanism is distinguished from the electrical feed mechanism not only in structure but somewhat in the mode of operation. Here the mandrel 14 does not carry the member 10 through the dies 16 when forming shoulders B', D' and E', but is fed therethrough at a rate equal the feed in rate of the member plus the material flow of the member 10. In this manner the member 10 is fed by the push rod 30 and the mandrel 14 with the latter remaining stationary with respect to the formed bore shoulder by being in contact therewith.

It is, therefore, to be noted the push rod 30 at least assists in driving the member 10 throughout the process never lagging the member 10 as in the electrical feed mechanism. To bring this distinction to the foreground the push rod 30 is shown in FIGS. 1, 2, 5, 6, 8 and 9 abutting the member 10.

It is also to be noted that the pistons 60 and 62 are the same size. If the rate at which the member 10 is to be fed into the die 16 is to be substantially the same whether the push rod 30 is to be the sole feeding means or if it is to be used in combination with the mandrel 14, then the force acting on the piston 60 should not exceed the force acting on the piston 62 if it alone is the feeding means for the member 10. Accordingly, the flow into and from the appropriate portions of the piston chambers 66 and 68 can be controlled by the valves 98 and 84, respectively, in any well-known manner.

It is to be understood that there are several hydraulic arrangements which would readily lend themselves to this process, and any one of which can be employed without departing from the spirit of this invention. For example, the mandrel piston chamber 66 can be constructed to have a smaller capacity than the rod piston chamber 68, and the flow into and from the chamber 68 can be controlled by the valve 84. In any event, the pressure force on the mandrel piston 60 in the direction of feed effected by the pressure differential thereacross should not be less than the elongation force acting in the direction away from the feed direction or in other words back toward the mandrel. Otherwise the mandrel 14 will be moved away from the die 16 instead of thereinto causing defects in the finished product which this invention eliminates.

In using the hydraulic feed mechanism, as when using the electrical feed mechanism the mandrel 14 is held within the effective die area when forming bore portions of uniform diameter—i.e., A', C' and F'. Accordingly, the pressure on either side of the piston 60 must be balanced. To this end a valve 104 is placed in the pipe 94 to cut off the exhaust 102 from the forward chamber 90 when the appropriate mandrel section A, C or F is centered within the die 16.

In order to actuate the valve 104 into its cut off position at the proper time, by way of illustration, an electrical contact system is provided. For convenience, a button 108 located on the member slide 72 is adapted to carry current from a suitable source (not shown), to strips 110, 112 and 114 located along the frame 40 whenever in contact therewith. A wire 116 common to the contacts is connected to the valve 104 and supplies current from the contacts to the valve 104 to cause it to move into its cut off position.

FIGS. 1–9 illustrate the steps in forming the member 10 using the hydraulic feeding mechanism. In forming the bore portion A' of uniform diameter, as shown in FIGS. 1 and 2, the push rod 30 alone feeds the member 10 into the dies 16, and the mandrel section A is maintained within the effective die area W. Accordingly, the member valve 84 is positioned to cause pressure fluid to be supplied to the rearward chamber portion 78 of the member chamber 68 and exhaust the forward chamber portion 76 thereof. In this manner, the piston 62 moves the push rod 30 in the direction of the die 16. And the mandrel piston 60 is maintained within the effective die area by closing the valve 104. The valve 104 is kept closed by having the input button 108 in contact with the frame contact 110 throughout a substantial portion of forming the bore portion A'.

The next portion B' to to formed is a tapered shoulder. At the commencement of forming the shoulder B' the leading edge b of the mandrel shoulder B should be directly underneath the foremost point S of the effective area of the die 16. Accordingly, just prior to the completion of bore A' the button 108 no longer makes contact with the strip 110, thereby causing the valve 104 to open. Thereafter fluid in the forward chamber 90 of the chamber 66 is exhausted via valve 98. This effects a pressure differential across the mandrel piston 60 sufficient to cause the mandrel 14 to move. This process is timed so that when the mandrel 14 has moved a distance X (as indicated in FIG. 5 and defined hereinbefore) the formation of bore portion A' is completed and the formation of shoulder B' commences.

It is to be noted from the foregoing the length of the strip 110 is the length of the bore portion A' less elongation and the distance X. Further, the length of the member 10 fed into the die 16 to form bore portion A' is the desired length less the calculated amount of elongation. In this manner the bore portion A' is of accurate length. However, since this is a terminal portion of the bore, if desired, an excess length may be formed and then cut to accurate length.

In FIG. 3 point b has been brought within the effective length W of the die 16 and the formation of the shoulder B' is well under way. The push rod 30 continues to feed the member 10 into the die 16 as the mandrel 14 moves at the feed out rate of the member 10, in other words the feed in rate of the member 10 plus the longitudinal component of material flow. In this manner both the mandrel 14 and the push rod 30 feed the member 10 into the dies 16 with the former being stationary with respect to the formed portion and moving relative to the push rod 30 by the amount of elongation.

The next bore portion to be formed is C', as shown in FIGS. 4, 5 and 6, and is of uniform diameter. The mandrel 14 is fed through the die 16 beyond the completion of the shoulder B' until its portion C is centered within the effective die area. At such time the button 108 contacts the strip 112 to close the valve 104 whereupon the mandrel piston 60 comes to a halt. At the time the mandrel portion C is being centered within the die 16 as in forming bore portion A' the push rod 30 alone feeds the member 10 through the die 16 so that the formation of bore portion C' commences without interruption.

The next bore portions to be formed are adjoining shoulders D' and E', as shown in FIG. 7. As in forming shoulder B', at the commencement of forming the shoulder D' the leading edge d thereof should be directly underneath point S. Accordingly, the mandrel 14 is moved a distance X (as shown in FIG. 5) sufficiently prior to completion of C in order that the formation of shoulder D' begins at the completion of bore portion C'. As before in going from bore portions A' to B' the button 108 discontinues contact with strip 112 just prior to beginning D to once again open the valve 104 to cause the mandrel piston 60 to move the mandrel 14 into the die 16 at the feed out rate of the member 10. And as in forming B' both the push rod 30 and mandrel 14 feed the member 10 into the die 16, and the mandrel 14 is held stationary with respect to the formed member 10.

It is to be noted from the foregoing the length of the strip 112 is the length of the bore portion C' less the mandrel length Z (as shown in FIG. 5), elongation and the distance X. The distance Z being from the leading edge of C to the mid-point thereof or in other words the distance C is moved to become centered within the die 16. Also note, the length of the member 10 is fed into the die 16 to form bore portion C' is the desired length less the calculated length of elongation.

FIGS. 8 and 9 show the forming of the bore portion F', the last portion of the gun barrel. Since this portion is of uniform diameter the mandrel 14 is fed into the dies 16 beyond the completion of shoulder E' until the mandrel section F is centered therewithin. At such time the button 108 makes contact with the strip 114 whereupon valve 104 closes, thereby causing the mandrel piston 60 and connected mandrel 14 to come to a halt. At the same time the push rod 30 takes over the feeding of the member 10 through die 16. In this manner the formation of bore portion F' commences upon completion of shoulder E' without interruption.

After the forming of the internal shape of the member 10 has been completed (see FIG. 9), the push rod 30 and the mandrel 14 are returned to their starting position by reversing the direction of the pistons 60 and 62. This is accomplished by appropriately changing the position of the valves 84 and 98 to reverse the pressure differential across the piston faces.

While I have shown and described a specific form of my invention, it is to be understood that various changes and modifications may be made without departing from the spirit of the invention as set forth in the appended claims.

What is claimed is:

1. A machine for forming a hollow member comprising a frame, jaws defining a pressure surface for deforming said member, a push rod adapted to abut one end of the member to be formed, a feed mechanism for moving said push rod to feed said member past said jaws, a mandrel adapted to pass longitudinally between said jaws, a second feed mechanism for feeding said mandrel, said second feed being adapted to move said mandrel past said jaws at a rate faster than the rate of feed of said push rod, and control means for said first and second feeding means adapted to cause the push rod to feed the member past said jaws for forming one portion of the member and to cause the mandrel to feed the member past said jaws for forming another portion of the member.

2. A machine as in claim 1 wherein the control means comprise a fixed contact, a control button adapted to move proportionally to the longitudinal movement of said mandrel for making contact with said fixed contact to control one phase of the mandrel feed, at least one other fixed contact, a second control button adapted to move proportionally to the longitudinal movement of said member for controlling another phase of the mandrel feed.

3. A machine for forming a hollow member comprising a frame, means defining a pressure surface for deforming said member, a push rod adapted to abut one end of the member, a piston in a chamber for moving said push rod longitudinally to feed said member past said pressure surface, a mandrel adapted to pass longitudinally past said pressure surface, a second piston in a chamber for feeding said mandrel, and control means for controlling the flow of fluid to said piston chambers including at least one fixed strip, a control button adapted to move proportionally to the longitudinal movement of said member for making contact with said fixed strip to thereby control the flow of pressure fluid in the second said chamber to stop said mandrel and for breaking contact with said strip to control pressure to the last said chamber to move said mandrel.

References Cited in the file of this patent

UNITED STATES PATENTS

| 570,816   | Priece | Nov. 3, 1896  |
|-----------|--------|---------------|
| 2,894,421 | Appel  | July 14, 1959 |

FOREIGN PATENTS

| 923,103   | Germany | Feb. 3, 1955 |
|-----------|---------|--------------|
| 1,209,679 | France  | Mar. 3, 1960 |